(12) United States Patent
Hyun

(10) Patent No.: US 9,295,244 B2
(45) Date of Patent: Mar. 29, 2016

(54) FISHING REEL WITH FISHHOOK HANGER

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 0 days.

(21) Appl. No.: 14/294,551

(22) Filed: Jun. 3, 2014

(65) Prior Publication Data

US 2014/0361111 A1    Dec. 11, 2014

(30) Foreign Application Priority Data

Jun. 5, 2013  (KR) .................. 10-2013-0064765

(51) Int. Cl.
| | | |
|---|---|---|
| *A01K 89/01* | (2006.01) | |
| *A01K 97/06* | (2006.01) | |
| *A01K 89/015* | (2006.01) | |
| *A01K 89/00* | (2006.01) | |

(52) U.S. Cl.
CPC ............. *A01K 97/06* (2013.01); *A01K 89/00* (2013.01); *A01K 89/015* (2013.01)

(58) Field of Classification Search
CPC ............ A01K 89/01; A01K 89/01121; A01K 89/015; A01K 89/0192; A01K 97/06
USPC ........................................................ 242/323
See application file for complete search history.

(56) References Cited

U.S. PATENT DOCUMENTS

| | | | | |
|---|---|---|---|---|
| 3,164,334 | A * | 1/1965 | Silvio ........................... | 242/323 |
| 3,697,011 | A * | 10/1972 | Christensen et al. ......... | 242/225 |
| 3,836,092 | A * | 9/1974 | Hull .............................. | 242/238 |
| 4,386,743 | A * | 6/1983 | Moss ............................ | 242/240 |
| 4,875,639 | A * | 10/1989 | Zurcher ........................ | 242/309 |
| 4,883,238 | A * | 11/1989 | Harder ......................... | 242/317 |
| 4,892,267 | A * | 1/1990 | Webb ............................ | 242/228 |
| 5,217,182 | A * | 6/1993 | Puryear et al. ................ | 242/321 |
| 5,897,069 | A * | 4/1999 | Brown et al. ................. | 242/310 |
| 7,374,118 | B2 * | 5/2008 | Oishi et al. ................... | 242/257 |
| 2003/0213862 | A1* | 11/2003 | Perrin ........................... | 242/322 |
| 2007/0114316 | A1* | 5/2007 | Klein ............................. | 242/278 |

FOREIGN PATENT DOCUMENTS

KR          100471571          7/1998

* cited by examiner

*Primary Examiner* — Emmanuel M Marcelo
(74) *Attorney, Agent, or Firm* — Cantor Colburn LLP

(57) ABSTRACT

Provided is a fishing reel with a fishhook hanger. The fishing reel includes: a reel body with a reception part formed in the reel body; and a fishhook hanger which has a hanging part to which a fishhook is hung, and a connection part coupled to the reception part. The fishhook can be stably hung on the hanging part of the fishhook hanger so that the fishhook can be prevented from damaging the fishing reel or injuring a user, and handling of the fishing rod with the fishing reel can be facilitated. Particularly, the fishhook hanger is configured such that it can be retractably extracted from the reel body. Therefore, the fishhook hanger can be retracted into the reel body as needed while the fishing rod is used. Furthermore, the fishhook hanger can be easily extracted from and retracted into the reel body in a simple manner.

5 Claims, 16 Drawing Sheets

FISHING REEL WITH FISHHOOK HANGER

BACKGROUND OF THE INVENTION

1. Field of the Invention

The present invention relates generally to fishing reel with fishhook hangers and, more particularly, to a fishing reel which includes: a reel body with a reception part formed in the reel body; and a fishhook hanger which has a hanging part to which a fishhook is hung, and a connection part coupled to the reception part, wherein the fishhook can be stably hung on the hanging part of the fishhook hanger so that the fishhook can be prevented from damaging the fishing reel or injuring a user, and handling of the fishing rod with the fishing reel can be facilitated when moving or carrying the fishing rod.

Particularly, the fishhook hanger is configured such that it can be retractably extracted from the reel body.

Therefore, the fishhook hanger can be retracted into the reel body as needed while the fishing rod is used, thus enhancing convenience in use. Furthermore, the fishhook hanger can be easily extracted from and retracted into the reel body in a simple manner, and a simple structure thereof can ensure high productivity.

2. Description of the Related Art

A representative example of a conventional fishing reel with a fishhook hanger was proposed in Korean Patent Registration No. 10-0471571 (May 5, 2005, hereinafter referred to as the 'conventional technique'), entitled "Reel body for double-bearing reel"

The conventional technique provides a reel body for a double-bearing reel in which a fishing line is wound around a spool which is rotatably provided. The conventional technique includes a frame, first and second covers, a front cover and a fishhook coupling part.

The frame includes a pair of side plates which are provided on opposite sides of the spool, and a plurality of connection parts which connect the side plates to each other.

The first and second covers are configured to respectively cover side surfaces of the side plates.

The front cover is provided to cover the front of the frame. The front cover has a slot which extends a predetermined length in a lateral direction and receives a fishing line guide of a level wind device.

The fishhook coupling part is a rod-shaped member which is provided at a position spaced outward apart from the front cover by a predetermined distance and disposed along the slot.

As such, the conventional technique having the above-mentioned construction is configured such that a fishhook can be hung on the fishhook coupling part so as to prevent the reel body from being scratched by the fishhook.

However, in the conventional technique, the fishhook coupling part is provided on the reel body in a form in which it always protrudes from the reel body. Given the fact that a user may grasp the reel in a variety of manners, the fishhook coupling part may inconvenience the user when he or she grasps the fishing reel.

Moreover, there is the possibility of the user being injured by the fishhook coupling part.

Therefore, development of a device to solve the above-mentioned problems is urgently required.

SUMMARY OF THE INVENTION

Accordingly, the present invention has been made keeping in mind the above problems occurring in the prior art, and an object of the present invention is to provide a fishing reel with a fishhook hanger which is configured such that a connection part of the fishhook hanger is rotatably coupled to a reception part of a reel body, whereby the fishhook hanger can be extracted from or retracted into the fishing reel as needed when a fishing rod is being used, thus making it more convenient to use, and in which extraction and retraction of the fishhook hanger can be performed in a simple manner, and the simple structure of the fishhook hanger can ensure high productivity.

Another object of the present invention is to provide a fishing reel with a fishhook hanger in which, extending along a path along which the hanging part rotates, a slot for rotation is formed in the reception part, and a stop protrusion is provided on the connection part and disposed in the slot for rotation so as to guide the rotation of the fishhook hanger, thus facilitating the extraction or retraction of the fishhook hanger, and preventing the hanging part from being excessively rotated from the inner cover and thus damaged.

A further object of the present invention is to provide a fishing reel with a fishhook hanger in which the fishhook hanger is elastically supported by an elastic member so that after the fishhook hanger is extracted from or retracted into the reel body, it can be maintained in the extracted or retracted state, thus making it more convenient to use.

Yet another object of the present invention is to provide a fishing reel with a fishhook hanger which includes an elastic member having a coiled part so that when the fishhook hanger rotates, the elastic member elastically biases the fishhook hanger towards a corresponding one of opposite ends of the slot for rotation based on a medial bent portion of the slot for rotation, whereby the extraction or retraction of the fishhook hanger can be easily conducted in a one-touch snap manner.

Still another object of the present invention is to provide a fishing reel with a fishhook hanger which includes an insert protrusion protruding from the hanging part in one direction, and an insert hole formed in the reception part so that the insert protrusion is inserted into the insert hole, whereby the fishhook hanger can be used as a line stopper in such a way that the fishing line is caught between the insert protrusion and an inner surface of the insert hole and fixed in place.

Still another object of the present invention is to provide a fishing reel with a fishhook hanger which includes an extraction means for enabling the hanging part to be extracted from or retracted into the reel body in a one-touch manner, thus facilitating the extraction and retraction of the fishhook hanger.

In order to accomplish the above object, the present invention provides a fishing reel with a fishhook hanger, including: a reel body comprising an inner cover, with a reception part formed in an inner surface of the inner cover; and a fishhook hanger comprising a hanging part on which a fishhook is hung, and a connection part connecting to the hanging part, the connection part being coupled to the reception part, wherein the fishhook hanger is configured such that the connection part is rotatably coupled to the reception part by a rotating shaft so that the hanging part is extracted from and retracted into the reel body.

The reception part may have therein a slot for rotation around the rotating shaft. The slot for rotation may extend in a direction in which the hanging part rotates. The fishhook hanger may include a stop protrusion provided on the connection part at a position adjacent to a shaft hole into which the rotating shaft is coupled. The stop protrusion may be inserted into the slot for rotation and maintain the hanging part in the reception part.

The fishhook hanger may include an elastic member installed in the inner cover. The elastic member may connect the stop protrusion to a retaining protrusion provided at a predetermined position in the inner cover.

The elastic member may include a first end connected to the retaining protrusion, a second end connected to the stop protrusion, and a coiled part formed between the first and second ends. The first and second ends of the elastic member may be elastically biased in directions opposite to directions in which the first and second ends rotate around the coiled part. The fishhook hanger may be configured such that when the stop protrusion rotates along the slot for rotation, the elastic member elastically biases the stop protrusion towards a corresponding one of opposite ends of the slot for rotation based on a bent portion of the slot for rotation so that the hanging part is maintained in an extracted or retracted state.

The hanging part may include a hook part that is open in a predetermined portion thereof.

The fishhook hanger may include an insert protrusion protruding from the hanging part in one direction, and an insert hole is formed in the reception part of the inner cover so that the insert protrusion is removably inserted into the insert hole. The fishhook hanger may function as a line stopper in such a way that a fishing line is caught between the insert protrusion and an inner surface of the insert hole and fixed in place.

The fishhook hanger may include an extraction means for enabling the hanging part that has been maintained in a retracted state to be extracted from the reel body in a one-touch manner.

A fishing reel with a fishhook hanger according to the present invention includes: a reel body with a reception part formed in the reel body; and a fishhook hanger which has a hanging part to which a fishhook is hung, and a connection part coupled to the reception part. In the present invention, the fishhook can be stably hung on the hanging part of the fishhook hanger so that the fishhook can be prevented from damaging the fishing reel or injuring a user. Handling a fishing rod with the fishing reel can be facilitated when moving or carrying the fishing rod.

The fishing reel according to the present invention is configured such that a connection part of the fishhook hanger is rotatably coupled to a reception part of a reel body, whereby the fishhook hanger can be extracted from or retracted into the fishing reel as needed when a fishing rod is being used, thus making it more convenient to use. Furthermore, extraction and retraction of the fishhook hanger can be performed in a simple manner, and the simple structure of the fishhook hanger can ensure high productivity.

In addition, extending along a path along which the hanging part rotates, a slot for rotation is formed in the reception part, and a stop protrusion is provided on the connection part and disposed in the slot for rotation. The slot for rotation and the stop protrusion ensure reliable extraction and retraction operation of the fishhook hanger and prevent the hanging part from being excessively rotated from the inner cover. Particularly, while the fishing line is hung on the fishhook hanger, the fishhook hanger can be prevented from being bent or excessively rotated by external force applied to the fishhook.

The fishing reel according to the present invention further includes an elastic member which connects the stop protrusion to a retaining protrusion provided in the inner cover. The fishhook hanger can be maintained in the extracted or retracted state by the elastic force of the elastic member, thus making it more convenient to use.

Furthermore, in the fishing reel according to the present invention, a coiled part is formed in a medial portion of the elastic member and configured such that opposite ends of the elastic member are elastically biased in directions opposite to directions in which the first and second ends rotate around the coiled part.

During the rotation of the fishhook hanger, when the elastic member passes through the medial bent portion of the slot for rotation, it contracts. After the elastic member passes through the medial bent portion, it widens again. Thereby, the extraction or retraction of the fishhook hanger can be conducted in a one-touch manner, thus making it more convenient to use.

Moreover, in the fishing reel according to the present invention, the fishhook hanger may further include an insert protrusion. In this case, when the hanging part is retracted into the reel body, the fishing line can be caught by the insert protrusion and fixed in place. Therefore, there is no need for using a separate line stopper or the like so that the cost burden can be reduced.

Particularly, the fishing reel according to the present invention may include an extraction means for enabling the hanging part that is in the retracted state to be extracted from the reel body in a one-touch manner. In this case, the extraction and retraction of the hanging part can be further facilitated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
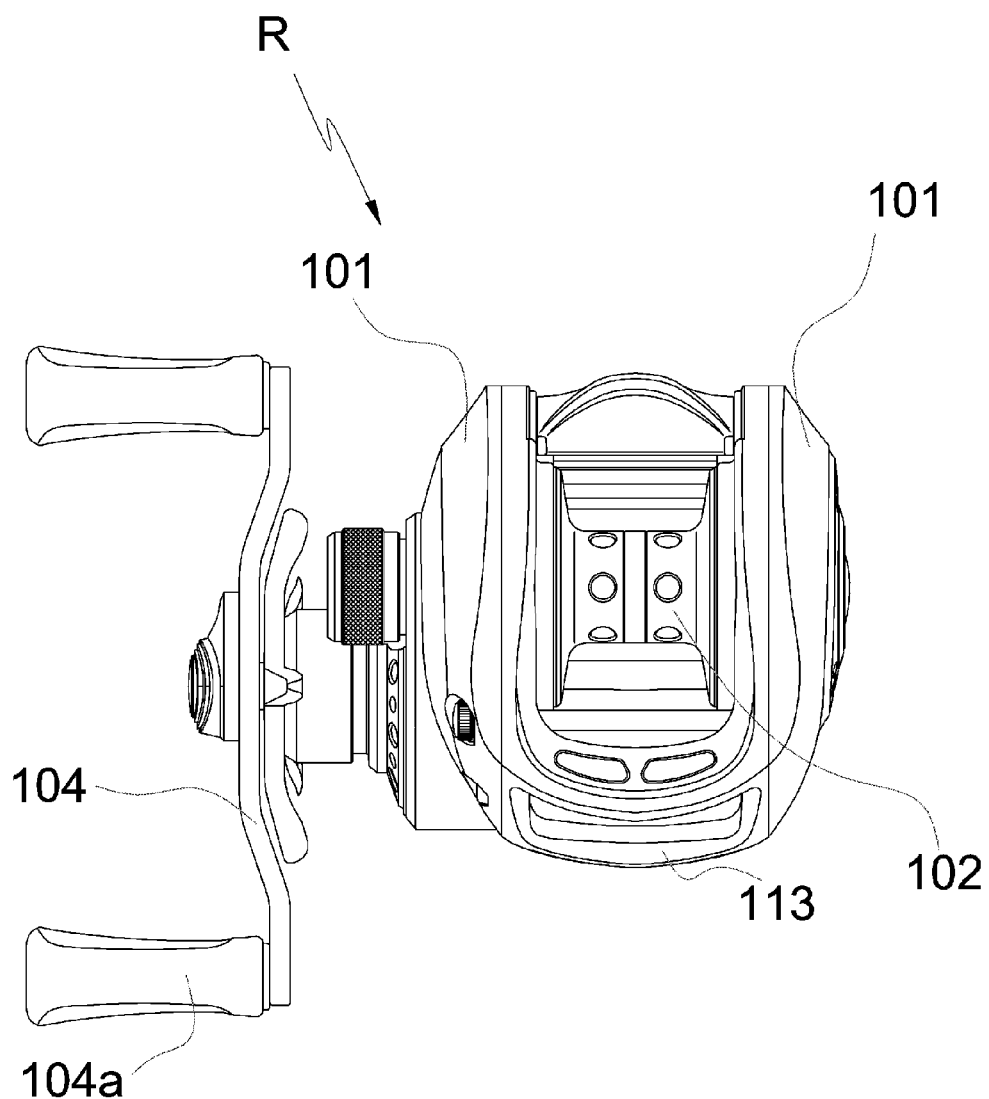
FIGS. 1 through 3 illustrate a fishing reel with a fishhook hanger according to an embodiment of the present invention.

Hereinafter, the present invention will be described in detail with reference to the attached drawings.

This invention may, however, be embodied in many different forms, and should not be construed as limited to the embodiments set forth herein. Rather, all changes that fall within the bounds of the present invention, or the equivalence of the bounds are therefore intended to be embraced by the present invention.

The same reference numerals throughout the drawings, that is, the same reference numerals for the second digit or the first digit, or for the second digit, the first digit and a letter of the alphabet, denote elements having the same function. If not specifically mentioned otherwise, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a," "an" and "the" are intended to include plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The ordinal numerals "first", "second", "third", etc. are used only for the sake of description and they categorically do not impose a limit on the order of production.

Figure 2:
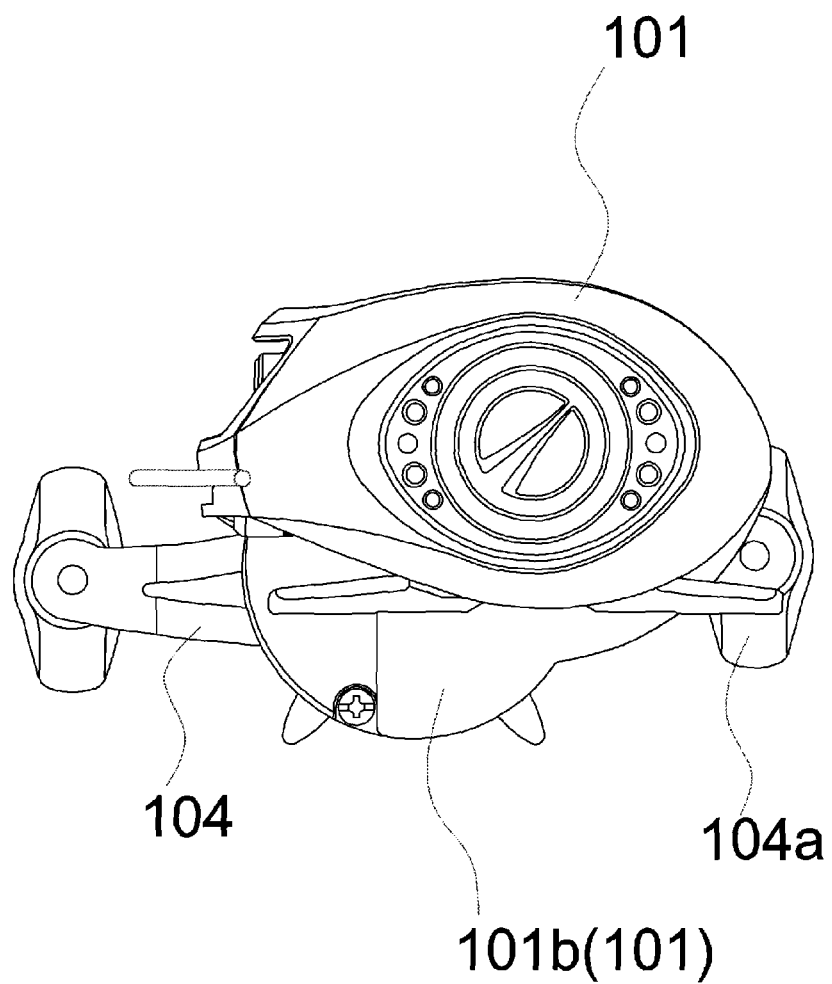
Figure 3:
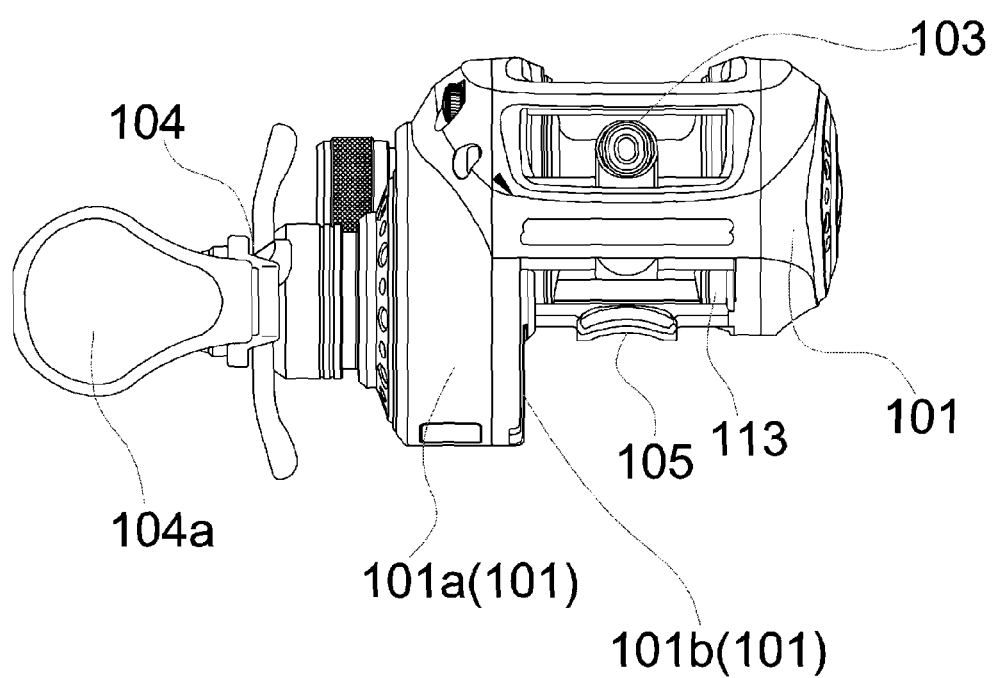

In the following description of a fishing reel with a fishhook hanger according to the present invention, for the sake of description, approximate direction reference is defined based on FIG. 2 as follows: the direction in which force of gravity is applied is a downward direction, and directions of up and down are defined based on directions shown in FIG. 2.

Furthermore, in this specification, the term 'hanging' means not only hanging a fishhook on a fishhook hanger but also that when a spool is rotated to reel in the fishing line, the fishhook is hooked to the fishhook hanger and pulled.

Hereinafter, a fishing reel with a fishhook hanger according to an embodiment of the present invention will be described in detail with reference to the attached drawings.

As shown in FIGS. 1 through 8, the fishing reel according to the embodiment of the present invention includes a reel body R and a fishhook hanger 120. The reel body R includes an inner cover 101b which has a reception part 107 in an inner surface thereof. The fishhook hanger 120 includes a hanging part 121 to which a fishhook is hooked, and a connection part 123 which extends from the hanging part 121 and is coupled to the reception part 107.

Furthermore, the fishhook hanger 120 is configured such that the connection part 123 is rotatably coupled to the reception part 107 by a rotating shaft 106 so that the hanging part 121 can be extracted from and retracted into the reel body R.

The reel body R is mounted to a reel seat (not shown) of a fishing rod and used in winding and unwinding a fishing line.

Cover members 101 are provided on respective opposite sides of the reel body R.

A spool 102 around which the fishing line is wound is rotatably provided between the cover member 101.

A guide 103 is connected between the cover members 101 and is disposed in front of the spool 102. The guide 103 moves leftwards and rightwards and guides the fishing line to prevent the fishing line from tangling.

Connected to the spool 102, a handle 104 is provided on a corresponding one of the cover members 101. The handle 104 is provided with a plurality of grips 104a so that a user grasps one of the grips 104a and manipulates the handle 104, thus winding the fishing line around the spool 102 or unwinding it therefrom.

Mounting pads 105 are provided under the respective cover members 101 and configured to be coupled to the reel seat 20 so that the reel body R can be fixed to the fishing rod.

As shown in FIGS. 4 through 7, in the fishing reel with the fishhook hanger 120 according to the present invention, the reception part 107 is formed in a depressed shape in the inner surface of the inner cover 101b of the cover member 101 that is provided with the handle 104.

The rotating shaft 106 is provided on the reception part 107. The fishhook hanger 120 that has a shape corresponding to that of the reception part 107 is coupled to the reception part 107 by the rotating shaft 106.

The fishhook hanger 120 includes the hanging part 121 which has a loop shape so that a fishhook can be hung on the hanging part 121, and the connection part 123 which connects to the hanging part 121 and has a shaft hole therein. Thus, the hanging part 121 can be extracted from or retracted into the reception part 107 of the cover member 101 in such a way that the fishhook hanger 120 rotates around the rotating shaft 106.

Figure 4:
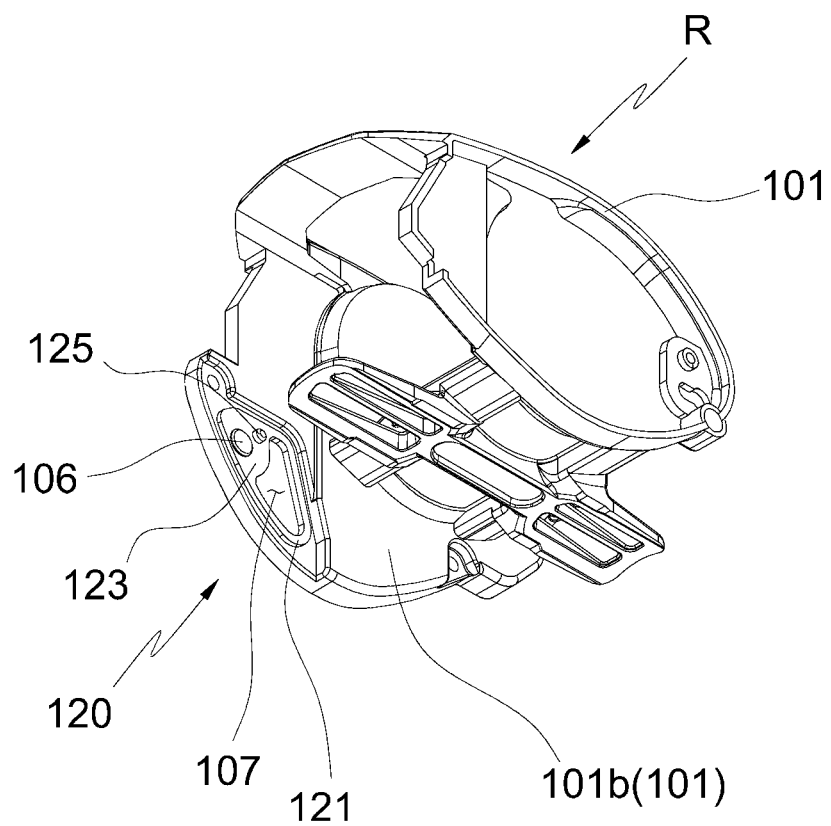
FIGS. 4 through 7 are views showing the fishhook hanger of the fishing reel according to the present invention from different directions.
Figure 5:
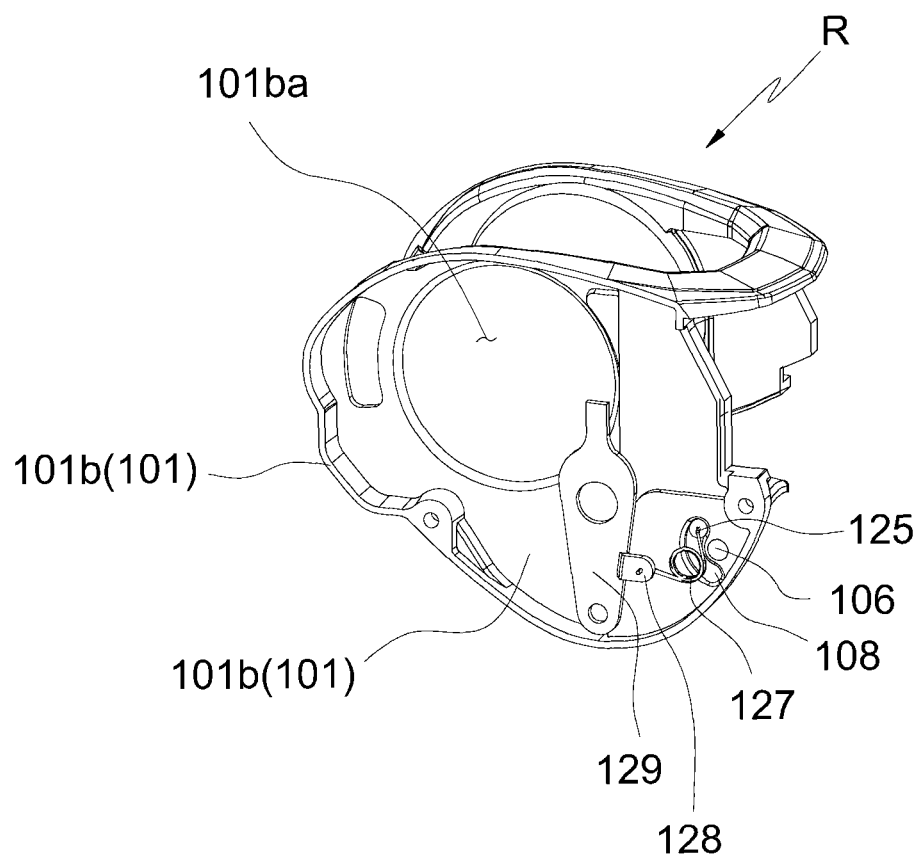

FIGS. 4 and 5 are perspective views illustrating a retracted state of the fishhook hanger 120 from different directions.

Figure 6:
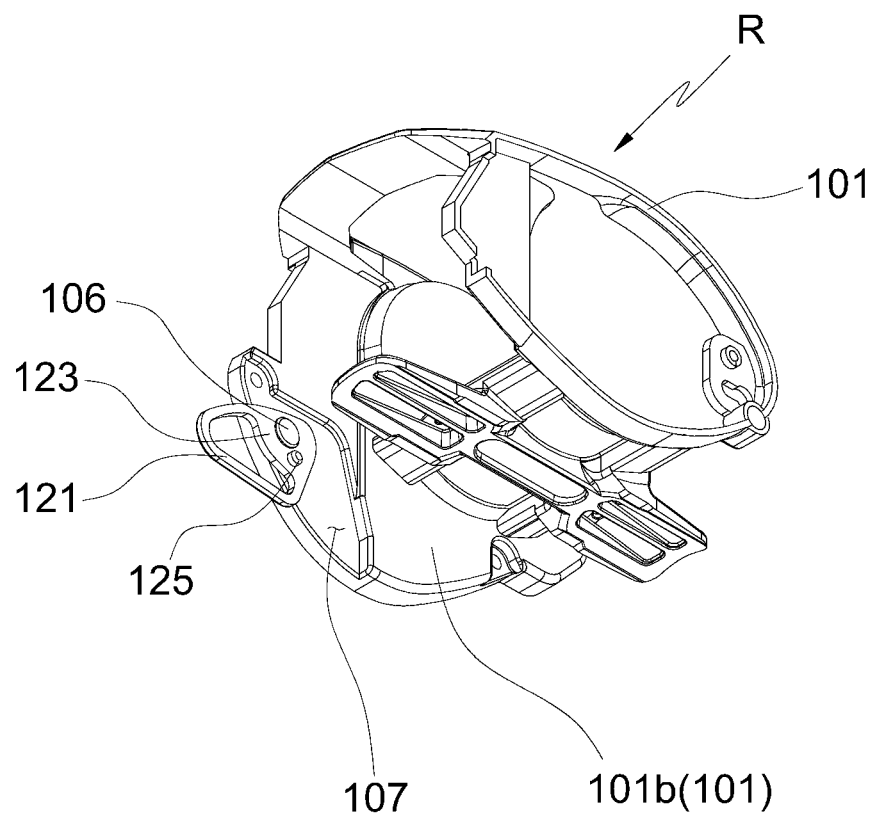
Figure 7:
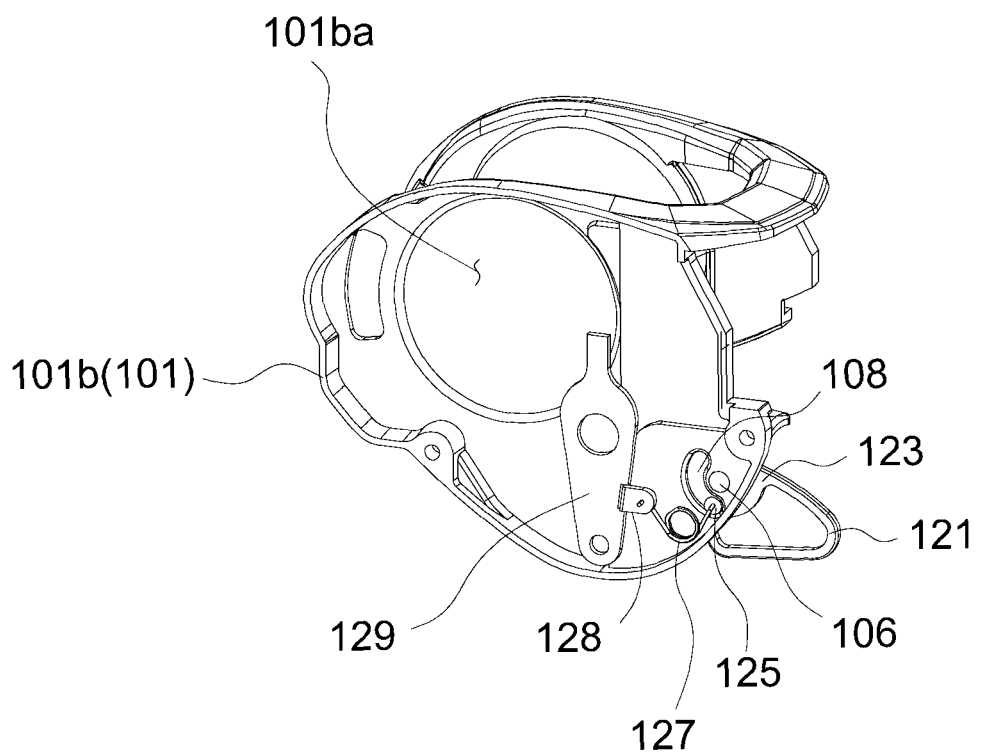

FIGS. 6 and 7 are perspective views illustrating an extracted state of the fishhook hanger 120 from different directions.

In FIGS. 4 through 7, for the sake of description, the illustration of the construction of a frame 101a and the handle 104 will be omitted.

The fishhook hanger 120 will be explained in detail with reference to FIGS. 2 through 7. A slot for rotation 108 is formed around the rotating shaft 106 in the reception part 107 of the inner cover 101b. The slot for rotation 108 extends a predetermined length in the same direction in which the hanging part 121 rotates.

The fishhook hanger 120 includes a stop protrusion 125 which is provided on the connection part 123 at a position adjacent to a shaft hole into which the rotating shaft 106 is coupled. The stop protrusion 125 is inserted into the slot for rotation 108 and functions to keep the hanging part 121 in the reception part 107.

A handle rotating space 101ba for allowing the rotation of the handle 104 is formed in the inner cover 101b so that the spool 102 is connected to the handle 104 through the handle rotating space 101ba.

Controlling the rotation of the handle 104, a control member 129 is provided around the handle rotating part 101ba.

The control member 129 has at a predetermined position a retaining protrusion 128 which is connected to the stop protrusion 125 by an elastic member 127 so that the rotation of the hanging part 121 can be embodied by a one-touch snap method.

Figure 8:
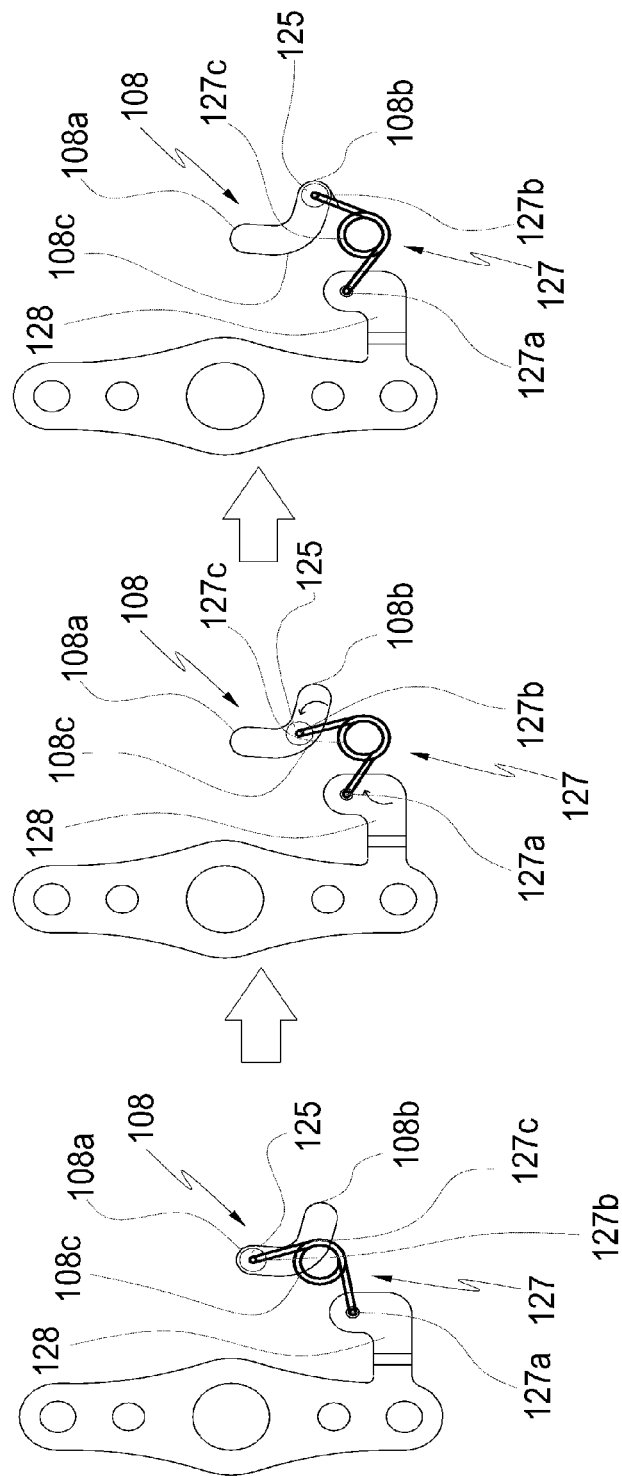
FIG. 8 is a view illustrating one-touch type extraction and retraction of the fishhook hanger of the fishing reel according to the present invention.
Figure 9:
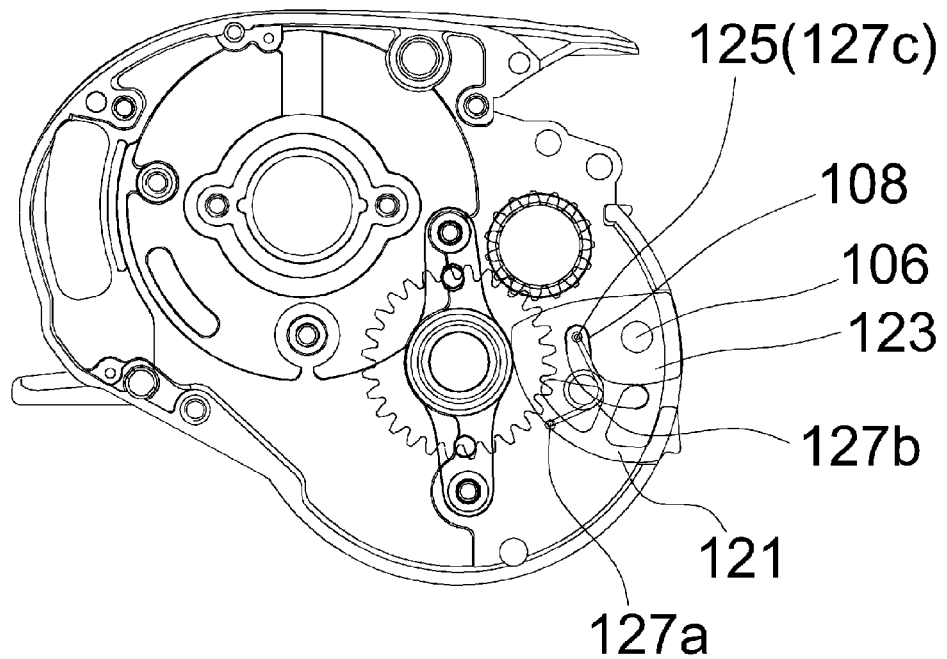
FIGS. 9 through 16 are views showing other embodiments of the fishhook hanger of the fishing reel according to the present invention.
Figure 10:
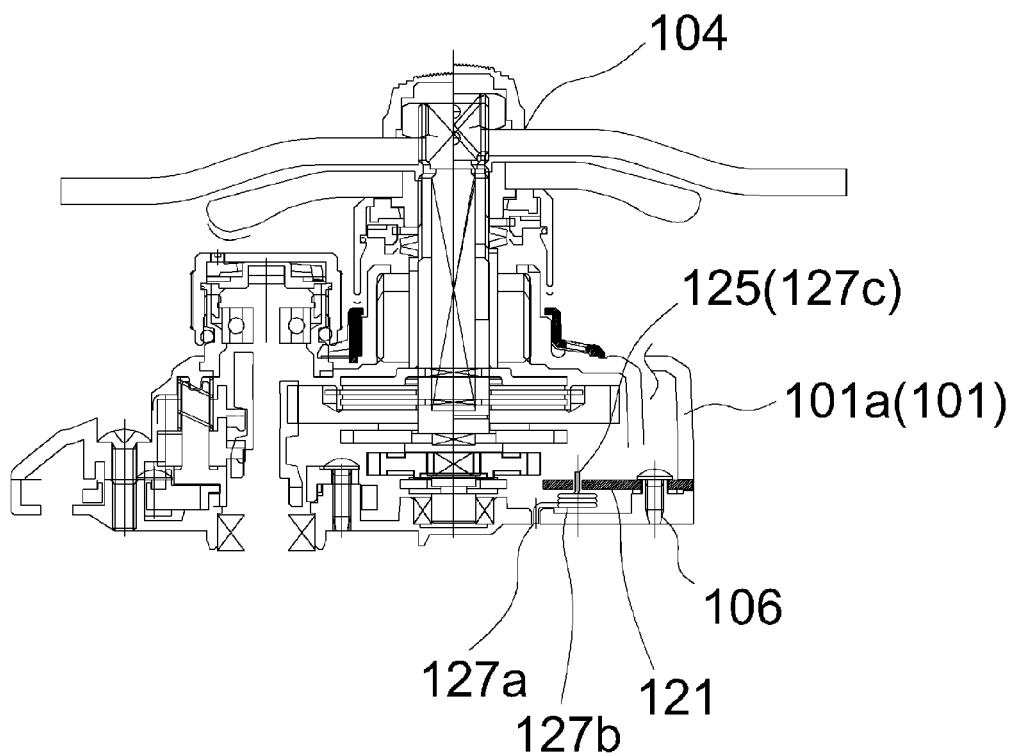
Figure 11:
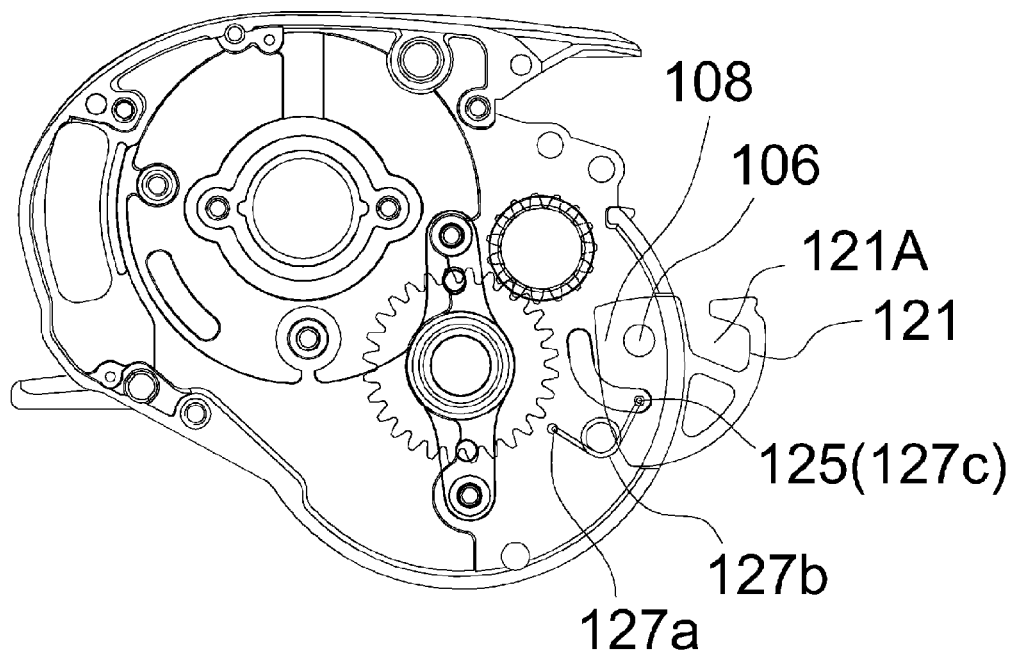
Figure 12:
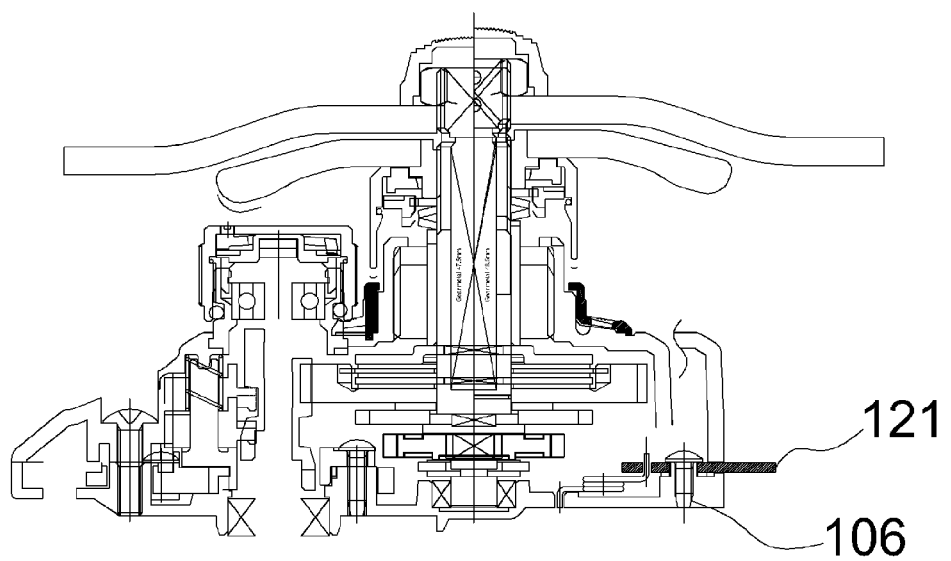
Figure 13:
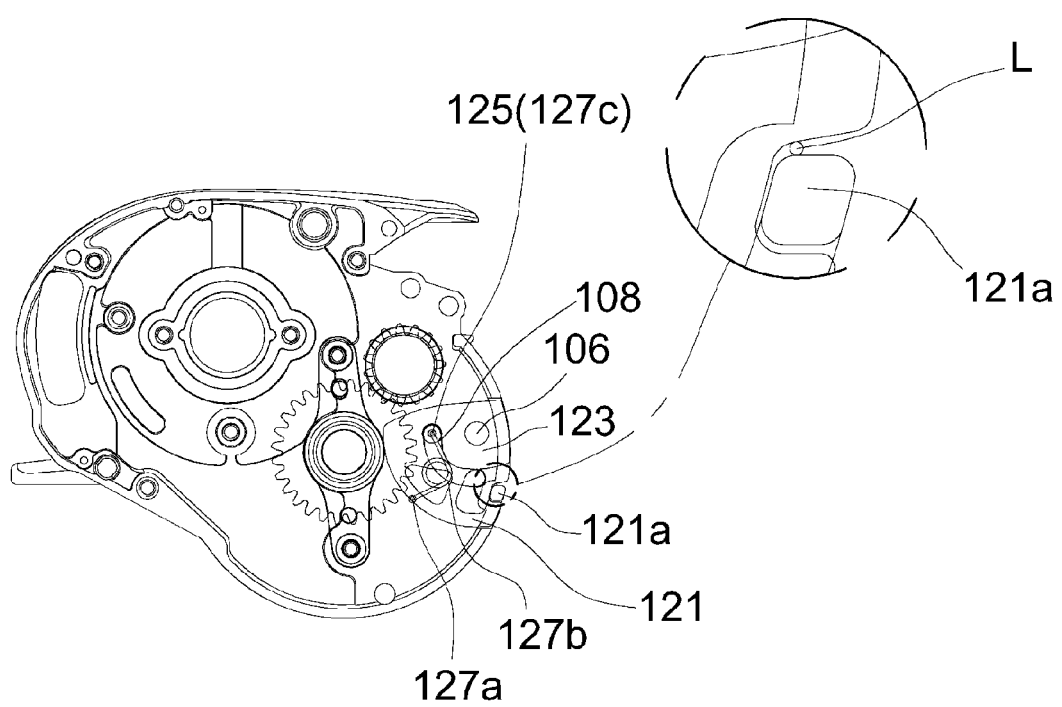
Figure 14:
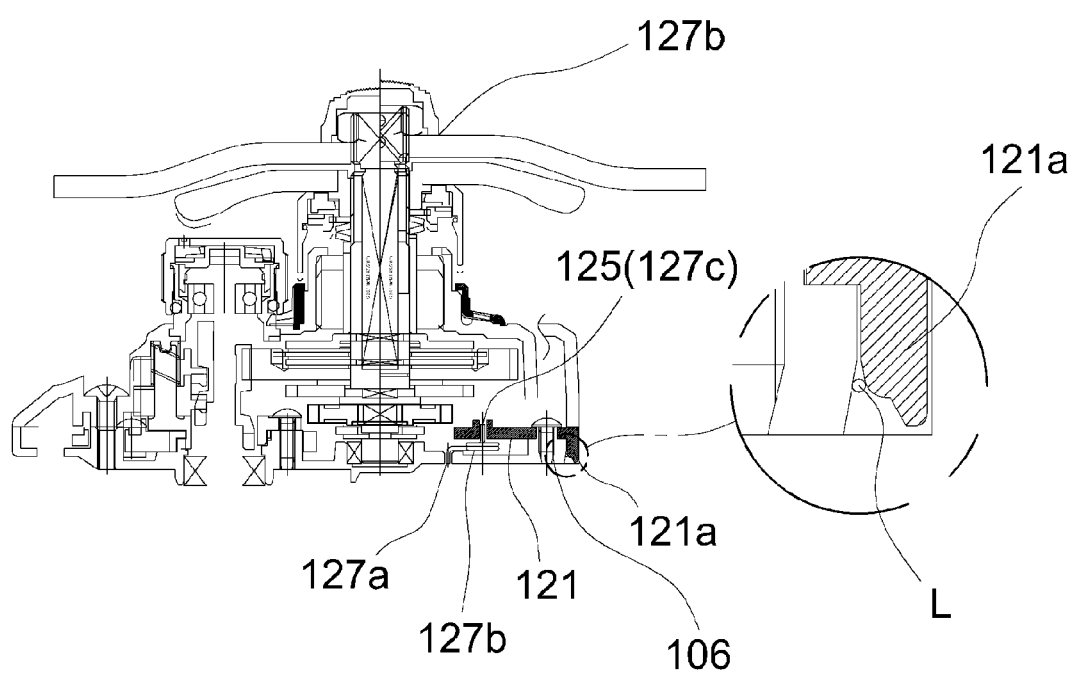
Figure 15:
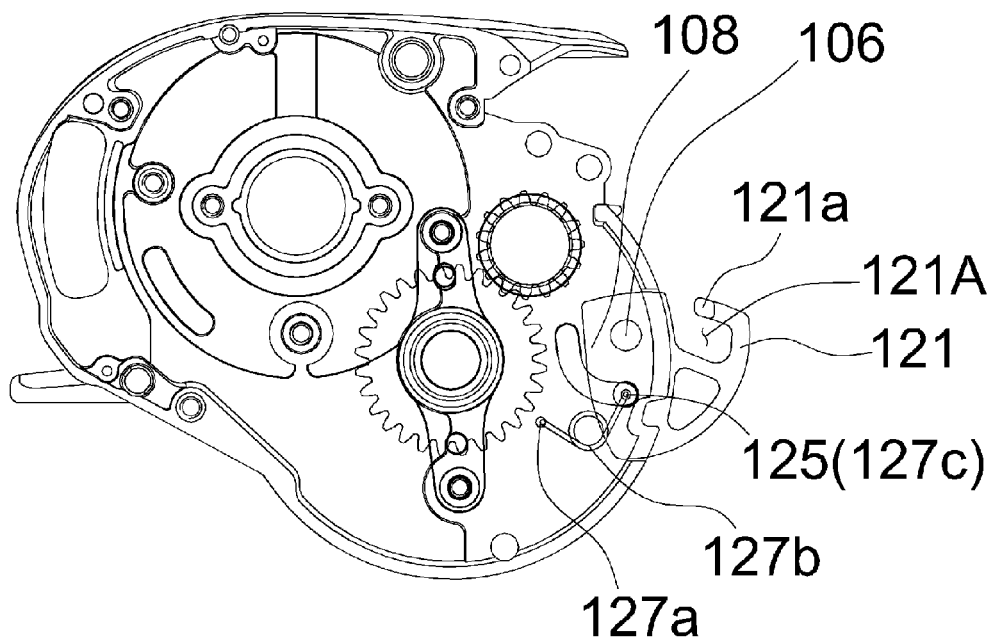
Figure 16:
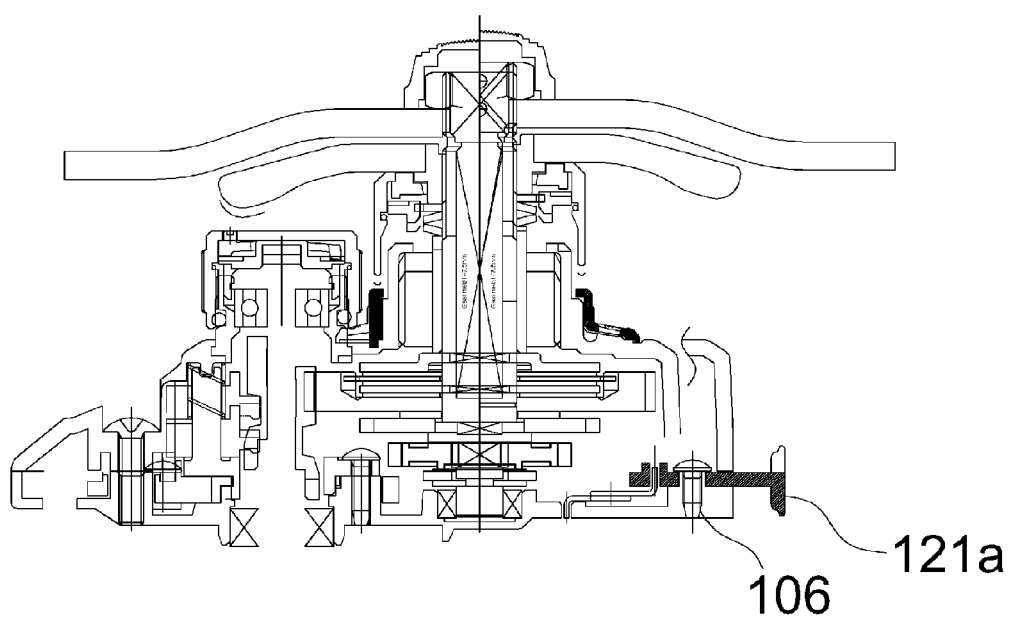

In detail, as shown in FIG. 8, the retaining protrusion 128 is provided on an end of the control member 129. A hole, to which a first end 127a of the elastic member 127 is coupled, is formed in the retaining protrusion 128.

The first end 127a of the elastic member 127 is hinged to the retaining protrusion 128, and a second end 127b thereof is hinged to the stop protrusion 125.

A hole, to which the second end 127b of the elastic member 127 is hinged, is formed in the stop protrusion 125

The elastic member 127 is a kind of torsion spring, which has a coiled part 127c in a medial portion thereof. The elastic member 127 is configured such that the first and second ends 127a and 127b are elastically biased in directions opposite to the directions in which the first and second ends 127a and 127b rotate around the coiled part 127c.

Therefore, as shown in FIGS. 2 through 8, when the hanging part 121 is extracted outwards from the reel body R, the stop protrusion 125 is maintained in the slot for rotation 108 while the hanging part 121 moves.

The first and second ends 127a and 127b of the elastic member 127 move to be close to each other when the stop protrusion 125 passes through a medial bent portion 108c that is formed between an inner end 108a and an outer end 108b of the slot for rotation 108.

After the stop protrusion 125 passes through the medial bent portion 108c, the first and second ends 127a and 127b of the elastic member 127 move away from each other again, whereby the stop protrusion 125 is elastically biased towards the outer end 108b of the slot for rotation 108.

Therefore, the hanging part 121 that has been extracted from the reel body R in a one-touch snap manner can be maintained in an extracted state.

When the hanging part 121 is retracted into the reel body R, the elastic member 127 is operated contrary to the abovementioned extraction operation. The elastic member 127 elastically biases the stop protrusion 125 towards the inner end 108a of the slot for rotation 108, whereby the hanging part 121 can be easily retracted into the reel body R and reliably maintained in a retracted state.

As such, the present invention is very convenient in that the user can manipulate the fishhook hanger 120 in a simple one-touch snap manner.

The fishhook hanger 120 according to the present invention may be modified into forms shown in FIGS. 9 through 16.

FIGS. 9 through 16 are projection views showing cross-sections of elements of the fishing reel for the sake of the description.

As shown in FIGS. 9 through 12, the fishing reel according to the present invention may configured in such a way that the hanging part 121 has a hook part 121A which is open in a predetermined portion thereof, and the first end 127a of the elastic member 127 is hinged to the inner cover 101b rather than to the retaining protrusion 128.

Particularly, the coupling structure of the elastic member shown in FIGS. 9 through 12 is applied to a fishing reel that does not have a separate control member 129. A coupling hole of the inner cover 101b to which the first end 127a of the elastic member 127 is coupled has the same function as that of the above-described retaining protrusion.

As shown in FIGS. 13 through 16, the fishing reel according to the present invention may configured in such a way that the fishhook hanger 120 includes an insert protrusion 121a which protrudes from an end of the hanging part 121 in one direction, and an insert hole (not designated) into which the insert protrusion 121a is inserted is formed in the reception part of the inner cover 101b. In this case, when the fishhook hanger 120 is retracted into the reel body, the insert protrusion 121a can function as a line stopper.

In other words, when the hanging part 121 of the fishhook hanger is in an extracted state, as described above, the fishhook is hung on the hook part 121A or the hanging part 121.

When there is a need for knotting the fishing line L or when the fishing reel is not in use, the fishing line L is hung on the insert protrusion 121a and then the hanging part 121 is retracted into the reel body. Then, the fishing line L is caught between the insert protrusion 121a and the surface of the insert hole and thus fixed in place so that the fishing line L can be prevented from tangling or being caught between the parts of the fishing reel and being damaged.

Therefore, the present invention can provide a fishing reel which has a function of a line stopper so that there is no need for purchasing a separate line stopper as additional fishing equipment.

The insert protrusion 121a and the insert hole may be formed towards either the frame 101a or the inner cover 101b.

Moreover, although it is not shown in the drawings, the fishhook hanger 120 preferably includes an extraction means configured in such a way that the hanging part 121 that is in the retracted state can be extracted in a one-touch manner (for example, in a manner similar to that of a push button used in a ball pen or the like or in a manner in which when the hanging part 121 is retracted and pressed, it is fixed in place, and when the hanging part 121 that is in the retracted state is pressed again, it is extracted). In this way, the operation of extracting the hanging part from the reel body or retracting it thereinto can be further facilitated.

Such different kinds of extraction means for user convenience can be modified in various forms without departing from the scope of the present invention. These modifications could be easily embodied by those skilled in this art.

Although the preferred embodiments of a fishing reel with a fishhook hanger the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel with a fishhook hanger, comprising:
a reel body comprising an inner cover, with a reception part formed in an inner surface of the inner cover; and
a fishhook hanger comprising a hanging part on which a fishhook is hung, and a connection part connecting to the hanging part, the connection part being coupled to the reception part,
wherein the fishhook hanger is configured such that the connection part is rotatably coupled to the reception part by a rotating shaft so that the hanging part is extracted from and retracted into the reel body,
wherein the reception part has therein a slot for rotation around the rotating shaft, the slot for rotation extending in a direction in which the hanging part rotates, and
the fishhook hanger comprises a stop protrusion provided on the connection part at a position adjacent to a shaft hole into which the rotating shaft is coupled, the stop protrusion being inserted into the slot for rotation and maintaining the part in the reception part.

2. The fishing reel as set forth in claim 1, wherein the fishhook hanger comprises an elastic member installed in the inner cover, the elastic member connecting the stop protrusion to a retaining protrusion provided at a predetermined position in the inner cover.

3. The fishing reel as set forth in claim 2, wherein the elastic member comprises a first end connected to the retaining protrusion, a second end connected to the stop protrusion, and a coiled part formed between the first and second ends,
wherein the first and second ends of the elastic member are elastically biased in directions opposite to directions in which the first and second ends rotate around the coiled part, and
the fishhook hanger is configured such that when the stop protrusion rotates along the slot for rotation, the elastic member elastically biases the stop protrusion towards a corresponding one of opposite ends of the slot for rotation based on a bent portion of the rotating slot so that the hanging part is maintained in an extracted or retracted state.

4. The fishing reel as set forth in claim 1, wherein the hanging part comprises a hook part that is open in a predetermined portion thereof.

5. A fishing reel with a fishhook hanger, comprising:
a reel body comprising an inner cover, with a reception part formed in an inner surface of the inner cover; and a fishhook hanger comprising a hanging part on which a fishhook is hung, and a connection part connecting to the hanging part, the connection part being coupled to the reception part, wherein the fishhook hanger is configured such that the connection part is rotatably coupled to the reception part by a rotating shaft so that the hanging part is extracted from and retracted into the reel body, wherein the fishhook hanger comprises an insert protrusion protruding from the hanging part in one direction, and an insert hole is formed in the reception part of the inner cover so that the insert protrusion is removably inserted into the insert hole, wherein the fishhook hanger functions as a line stopper in such a way that a fishing line is caught between the insert protrusion and an inner surface of the insert hole and fixed in place.

* * * * *